US008746612B2

(12) United States Patent
Delloue et al.

(10) Patent No.: US 8,746,612 B2
(45) Date of Patent: Jun. 10, 2014

(54) AIRCRAFT FITTED WITH AN INDEPENDENT DRIVE DEVICE

(75) Inventors: David Delloue, Le Plessis-Robinson (FR); Hervé Charuel, Nozay (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 118 days.

(21) Appl. No.: 13/157,051

(22) Filed: Jun. 9, 2011

(65) Prior Publication Data

US 2011/0303785 A1 Dec. 15, 2011

(30) Foreign Application Priority Data

Jun. 10, 2010 (FR) ...................................... 10 54604

(51) Int. Cl.
*B64C 25/50* (2006.01)
(52) U.S. Cl.
USPC ......................................................... 244/50
(58) Field of Classification Search
CPC ........ B64C 25/42; B64C 25/44; B64C 25/48; B64C 25/45; B64C 22/50; B64C 25/405
USPC .................................... 244/50; 180/302, 307
See application file for complete search history.

(56) References Cited

U.S. PATENT DOCUMENTS 3,807,664 A * 4/1974 Kelly et al. ..................... 244/50
3,874,619 A * 4/1975 Collins et al. ................... 244/50
6,193,326 B1 * 2/2001 Ybert ............................... 303/15
2006/0260323 A1 * 11/2006 Moulebhar ...................... 60/793
2009/0294577 A1 * 12/2009 Roques et al. .................. 244/50

FOREIGN PATENT DOCUMENTS

WO 95/29094 A1 11/1995

OTHER PUBLICATIONS

International Search Report for FR 1054604 dated Jan. 7, 2011.

* cited by examiner

*Primary Examiner* — Tien Dinh
*Assistant Examiner* — Justin Benedik
(74) *Attorney, Agent, or Firm* — Sughrue Mion, PLLC

(57) ABSTRACT

An aircraft having wheels with hydraulically-actuating friction brakes and independent drives for driving the wheels in rotation and enabling the aircraft to move in stages of independent drive when engines of the aircraft are inactive. A main hydraulic circuit with a pressure source powers the brakes when the pressure source is active; with an alternative braking circuit for enabling the brake system at least when the engines of the aircraft are stopped. The alternative braking circuit includes an accumulator that is used for parking braking and is kept under pressure by the pressure source of the main circuit when the pressure source is active. An auxiliary hydraulic circuit pressurized by an auxiliary pump and power system enables the independent drives to be actuated. The auxiliary hydraulic circuit is connected to the alternative braking circuit to maintain an operating pressure in the accumulator of the alternative braking circuit.

2 Claims, 1 Drawing Sheet

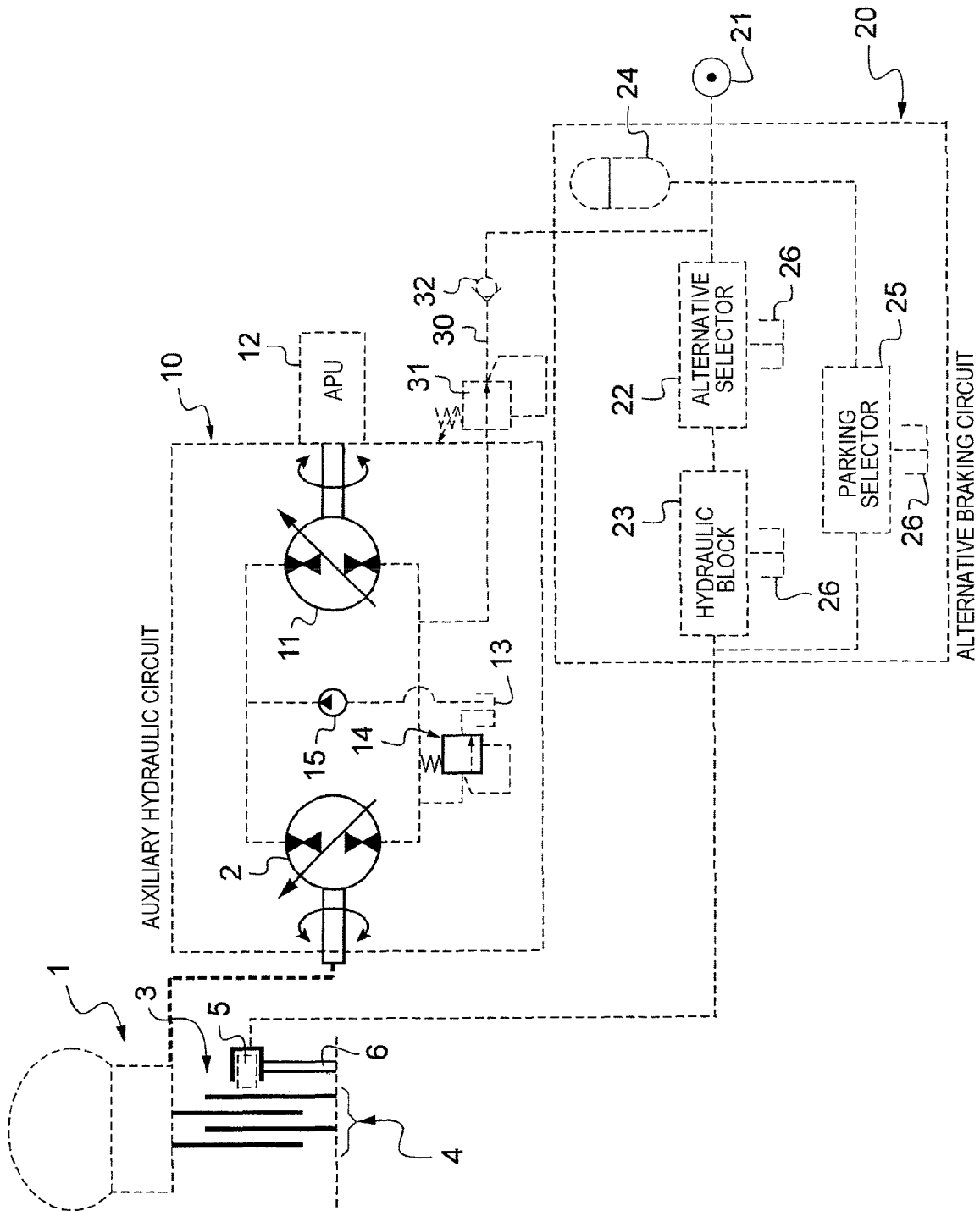

AIRCRAFT FITTED WITH AN INDEPENDENT DRIVE DEVICE

The invention relates to an aircraft fitted with an independent drive device.

TECHNOLOGICAL BACKGROUND OF THE INVENTION

Proposals have been made to fit aircraft landing gear with independent drive devices including electric motors located as close as possible to wheels carried by the undercarriages in order to drive the wheels in rotation and thus enable the aircraft to move without help from the engines of the aircraft.

It is tempting to fit the wheels with hydraulic motors suitable for use both for driving movement of the aircraft and also for braking it, rather like the brakes on construction machines fitted with such motor-driven wheels, and making use of hydrostatic transmission.

Nevertheless, the use of such wheels assumes that a source of hydraulic pressure is available. On an aircraft, the pumps that generate hydraulic pressure are driven by the engines of the aircraft, which means that those engines must therefore be active when the aircraft is moving, even if they are idling. However, it is known that the residual thrust from engines that are idling is itself sufficient to cause the aircraft to advance, which means that it is necessary constantly to apply the brakes to the wheels in order to prevent the aircraft from moving.

Proposals have been made, in document WO 2010/0046520 to form an auxiliary hydraulic circuit in which a pump is actuated by an auxiliary power unit (APU) of the aircraft. The pump may be driven mechanically by a shaft of the APU or it may have an electric motor that takes its electrical power from the power delivered by an alternator that is driven by the APU. Thus, the independent drive devices may be powered hydraulically by means of an auxiliary hydraulic circuit pressurized by an auxiliary pump activated by means of the APU, thereby enabling the aircraft to be moved without help from its engines.

Nevertheless, the friction brakes of the aircraft are also hydraulically activated. It is known that the brakes are powered by the main hydraulic circuits of the aircraft. Certain aircraft are fitted with an alternative hydraulic circuit, that take over from the main circuits when they have failed or are not activated. The alternative braking circuit includes an accumulator that enables some limited number of braking operations to be performed when the alternative braking circuit is itself not being pressurized, in particular because the engines are stopped. Nevertheless, the number of braking operations that it is possible to perform is very limited. An intermediate solution for increasing the number of possible braking operations would be to increase the size of the accumulator, but that quickly becomes penalizing in terms of weight.

Document U.S. Pat. No. 3,807,664 describes an aircraft fitted with a braking circuit and a circuit for powering independent drive means.

Those two circuits are fed with pressure either by a pump of the aircraft driven by its engines, or by an auxiliary pump driven by the APU.

OBJECT OF THE INVENTION

An object of the invention is to improve the hydraulic organization of the aircraft so as to enable a large number of braking operations to be performed during stages of independent drive.

BRIEF DESCRIPTION OF THE INVENTION

In order to achieve this object, the invention provides an aircraft having wheels fitted with hydraulically-actuating friction brake means and also hydraulically-actuated independent drive means for driving the wheels in rotation and enabling the aircraft to move in stages of independent drive in which the engines of the aircraft are inactive. According to the invention, the aircraft is fitted with at least:

a main hydraulic circuit including a pressure source that powers the brake means when said pressure source is active;

an alternative braking circuit for enabling brake means to be actuated at least when the engines of the aircraft are stopped, the alternative braking circuit including an accumulator that is normally used for parking braking and that is kept under pressure by the pressure source of the main circuit when said pressure source is active; and an auxiliary hydraulic circuit pressurized by auxiliary pump means activated by an auxiliary power unit of the aircraft to enable the independent drive means to be actuated;

the auxiliary hydraulic circuit being connected to the alternative braking circuit to maintain an operating pressure in the accumulator of the alternative braking circuit.

It is known that the accumulator of the alternative braking circuit is repressurized by the pumps of the main hydraulic circuits of the aircraft on each flight. This accumulator serves to power the brakes when the main hydraulic circuits have failed or are not active. This accumulator thus enables the aircraft to be prevented from moving by applying parking braking. This parking braking may be used as ultimate braking in the event of all sources of pressure being lost. It might be thought that this accumulator could be used as a source of pressure for performing braking with the help of the alternative braking circuit. Unfortunately, each time the pilot applies the brakes and then releases them, some of the fluid delivered by the accumulator is returned to the tank of the main circuit of the aircraft, such that the accumulator inevitably empties out progressively each time the brakes are used. It is known that the accumulator is generally of dimensions that allow the pilot to apply the brakes a few times. Nevertheless, using the provisions of the invention, the accumulator of the alternative circuit is maintained continuously under pressure by the auxiliary hydraulic circuit during stages of deceleration, thus enabling the brakes to be used as often as desired during a stage of independent drive.

BRIEF DESCRIPTION OF THE FIGURE

The invention can be better understood in the light of the following description of the sole FIGURE, which is a fragmentary diagram of the hydraulic circuit of an aircraft illustrating the provisions of the invention.

DETAILED DESCRIPTION OF THE FIGURES

The invention is illustrated below in application to an aircraft including wheels that are fitted with independent drive devices in the form of hydraulic motors, and wheels fitted with brake devices in the form of hydraulically-actuated friction brakes. Where appropriate, some of the wheels or even all of the wheels carried by the main undercarriages of the aircraft may be fitted simultaneously with an independent drive device and with a brake device, as is envisaged herein.

As shown in the FIGURE, the aircraft has wheels 1 (wheels carried by the main undercarriages), each of which is fitted with a hydraulic motor 2, e.g. a motor of the type having radial pistons. A bold dashed line represents the mechanical connection between the wheel 1 and the rotary shaft of the hydraulic motor 2. The wheels 1 are also fitted with friction brakes 3 having friction disks 4, some of which rotate with the wheel and others of which do not rotate with the wheel, the disks being selectively pressed against one another by hydraulic actuator means 5 carried by a hydraulic ring 6.

The aircraft generally also includes at least one main hydraulic circuit (not shown in the figures) that is pressurized by a pump driven by one of the aircraft engines, the pump taking fluid from a main tank of the aircraft. The main hydraulic circuit is used for pressurizing the hydraulic actuators of the friction brakes.

It is known to fit an aircraft with an alternative braking circuit 20, which circuit is normally maintained under pressure by a pressure source 21 of the aircraft (e.g. a pump driven by one of its engines). The alternative braking circuit 20 takes over from the main braking circuit(s) in the event of said main circuit(s) failing or being inactive. The alternative braking circuit 20 includes an alternative braking selector 22 that allows pressure to be admitted into an alternative hydraulic block 23 that regulates the pressure for transmission to the hydraulic actuators 5 that press together the friction disks 4, some of which are stationary and others of which are constrained to rotate with the wheel. The alternative braking circuit 20 also includes an accumulator 24 that serves, via a parking selector 25, to apply a parking force to the disk 4 that corresponds to the pressure that exists in the accumulator 24. It is known that in the event of a failure of the pressure sources of the aircraft, the parking brake should be used for ultimate braking. For this purpose, the accumulator 24 is dimensioned so as to be capable of performing a few braking operations before the accumulator runs out of hydraulic fluid that is discharged to the main tank 26 of the aircraft each time the pilot releases pressure on the brake pedals.

The hydraulic motors 2 constituting the independent drive devices are powered by an auxiliary hydraulic circuit 10 including a bidirectional pump 11 that is connected to the hydraulic motors 2 by the auxiliary circuit 10 to form a hydrostatic transmission. In this example, the pump 11 is driven mechanically by a shaft of an auxiliary power unit 12 of the aircraft. The pump 11 is thus situated close to the auxiliary power unit, in the tail of the aircraft, and the auxiliary hydraulic circuit 10 extends so as to convey hydraulic fluid from the tail of the aircraft to the hydraulic motors 2, and back again.

The auxiliary hydraulic circuit is connected to an auxiliary tank 13 that is distinct from the main tank 25 of the main hydraulic circuit and of the alternative braking circuit 20 of the aircraft. A diverter device 14 (in dashed lines in the FIGURE) serves to take a fraction of the fluid from the auxiliary hydraulic circuit 10 so as to cause it to pass into the auxiliary tank 13 and cause it to be reinjected into the auxiliary circuit 10 by means of a booster pump 15, for the purposes of cooling the fluid and of compensating for any variations in fluid volumes due to the thermal expansion or the compressibility of the fluid. Naturally, the booster pump, well known in itself, is shown here in symbolic manner, and it is clear that boosting could be provided on the other line of the pump if the hydraulic transmission between the pump and the hydraulic motor is to operate in both directions.

One of the connection lines between the pump and the hydraulic motor could also be fitted with a controlled constriction member so as to organize in selective manner resistance to the flow of fluid towards the pump in order to slow down the associated motor, thereby contributing to braking the wheel. This hydraulic resistance serves to compensate for the low inertia of the auxiliary power unit, and also makes it possible to provide braking in addition to the braking provided by the friction brakes.

According to an essential provision of the invention, the auxiliary hydraulic circuit 10 is used to maintain the pressure in the accumulator 24 of the alternating braking circuit 20, at least until the engine units of the aircraft are stopped and the main hydraulic circuits are no longer pressurized.

In the absence of pressure coming from traditional pressure sources of the aircraft, advantage is taken of the aircraft decelerating, i.e. periods during which the wheel drives the associated hydraulic motor 2. The fluid in the auxiliary hydraulic circuit is thus diverted during these stages via a hydraulic line 30 fitted with an expander 31 and a check valve 32 leading to the alternative braking circuit 20 in order to repressurize the accumulator 24 and thus maintain its service pressure and regenerate the volume of fluid contained in the accumulator 24 after each braking operation. It is necessary to use an expander because the pressure in the hydrostatic connection may be much greater than the pressure that exists in the accumulator.

It is also possible to take fluid that is pressurized by the bidirectional pump 11 of the auxiliary hydraulic circuit 10 downstream therefrom so as to be reinjected into the alternative braking circuit 20, upstream from the selectors 22 and 25.

The pilot can thus at will perform a certain number of braking operations even when the engines of the aircraft are stopped and the main hydraulic circuits are not in operation.

Thus, although the fluid from the accumulator 24 is emptied out into the main tank 26 of the aircraft each time the pilot presses on the brake pedals and then releases them, the accumulator 24 is permanently maintained under pressure by the auxiliary hydraulic circuit 10. The pilot may then brake at will without being limited by the capacity of the accumulator 24 of the alternative hydraulic circuit. Naturally, this arrangement causes fluid to be transferred from the auxiliary tank 13 to the main tank 26 each time the brakes are actuated. Under such circumstances, it is necessary for the auxiliary tank to be dimensioned so as to ensure that it is not emptied by the braking operations performed by the pilot.

The invention is not limited to the above description, but covers any variant coming within the ambit defined by the claims.

In particular, although an auxiliary hydraulic circuit is described above in which the pump(s) is/are driven mechanically by a shaft of the auxiliary power unit, either directly or via gearing, the auxiliary hydraulic circuit could comprise, either in addition to mechanically-driven pumps, or as a replacement for mechanically-driven pumps, one or more electrically-driven pumps that are powered electrically by an electricity generator driven by the auxiliary power unit.

Although it is stated above that the tank of the auxiliary hydraulic circuit is separate from the tank of the main hydraulic circuit, it is possible to make provision for a single tank.

The invention claimed is:

1. An aircraft having wheels fitted with hydraulically-actuating friction brake means and also hydraulically-actuated independent drive means for driving the wheels in rotation and enabling the aircraft to move in stages of independent drive in which the engines of the aircraft are inactive, wherein the aircraft is fitted with at least:

a main hydraulic circuit including a first pressure source, activated by at least one of the main aircraft engines, that powers the brake means when the first pressure source is active;

an alternative braking circuit for enabling brake means to be actuated at least when the engines of the aircraft are stopped, the alternative braking circuit including an accumulator that is used for parking braking; and an auxiliary hydraulic circuit pressurized by an auxiliary pump means activated by an auxiliary power unit of the aircraft to enable the independent drive means to be actuated;

the auxiliary hydraulic circuit being connected to the alternative braking circuit to maintain an operating pressure in the accumulator of the alternative braking circuit, wherein the accumulator is kept under pressure by the first pressure source of the main circuit when the first pressure source is active; and wherein the accumulator is kept under pressure by the auxiliary pump means when the first pressure source is inactive.

2. An aircraft according to claim 1, wherein the auxiliary hydraulic circuit and the alternative braking circuit are connected together by means of a hydraulic connection including an expander.

* * * * *